United States Patent
Suzuki et al.

(10) Patent No.: US 9,715,971 B2
(45) Date of Patent: Jul. 25, 2017

(54) ALUMINUM ALLOY FOIL FOR ELECTRODE CHARGE COLLECTOR, AND METHOD FOR PRODUCING SAME

(71) Applicants: UACJ Corporation, Chiyoda-ku, Tokyo (JP); UACJ Foil Corporation, Chuo-ku, Tokyo (JP)

(72) Inventors: Satoshi Suzuki, Chiyoda-ku (JP); Masakazu Seki, Chiyoda-ku (JP); Tomohiko Furutani, Chuo-ku (JP); Kenji Yamamoto, Chuo-ku (JP)

(73) Assignees: UACJ CORPORATION, Tokyo (JP); UACJ FOIL CORPORATION, Tokyo (JP)

( * ) Notice: Subject to any disclaimer, the term of this patent is extended or adjusted under 35 U.S.C. 154(b) by 274 days.

(21) Appl. No.: 14/377,330

(22) PCT Filed: Feb. 20, 2013

(86) PCT No.: PCT/JP2013/054141
§ 371 (c)(1),
(2) Date: Aug. 7, 2014

(87) PCT Pub. No.: WO2013/125565
PCT Pub. Date: Aug. 29, 2013

(65) Prior Publication Data
US 2015/0248973 A1    Sep. 3, 2015

(30) Foreign Application Priority Data
Feb. 21, 2012 (JP) ................................. 2012-035442

(51) Int. Cl.
C22C 21/00 (2006.01)
C22F 1/04 (2006.01)
H01G 11/68 (2013.01)
C22C 21/02 (2006.01)
C22F 1/043 (2006.01)
H01M 4/66 (2006.01)
H01M 4/70 (2006.01)
B22D 27/20 (2006.01)
H01M 4/02 (2006.01)

(52) U.S. Cl.
CPC ............. *H01G 11/68* (2013.01); *C22C 21/00* (2013.01); *C22C 21/02* (2013.01); *C22F 1/04* (2013.01); *C22F 1/043* (2013.01); *H01M 4/662* (2013.01); *H01M 4/70* (2013.01); *B22D 27/20* (2013.01); *H01M 2004/021* (2013.01)

(58) Field of Classification Search
CPC ....................... C22C 21/00; C22F 1/04–1/057
See application file for complete search history.

(56) References Cited

U.S. PATENT DOCUMENTS

2014/0255788 A1* 9/2014 Seki ........................... C22F 1/04
429/245

FOREIGN PATENT DOCUMENTS

| JP | 63-18041 A | 1/1988 | |
| JP | 1-215959 A | 8/1989 | |
| JP | 5-247609 A | 9/1993 | |
| JP | 11-21646 A | 1/1999 | |
| JP | 2011-162470 A | 6/1999 | |
| JP | 2000-282196 A | 10/2000 | |
| JP | 2007-138234 A | 6/2007 | |
| JP | 2007-197792 A | 8/2007 | |
| JP | 2008-150651 A | 7/2008 | |
| JP | 2010-150637 A | 7/2010 | |
| JP | 2010-248551 A | 11/2010 | |
| WO | WO 2013-018157 | * 2/2013 | ................ C22F 1/04 |

OTHER PUBLICATIONS

International Search Report mailed May 28, 2013, issued in corresponding International Application No. PCT/JP2013/054141, filed Feb. 20, 2013, 4 pages.
Extended European Search Report mailed Nov. 4, 2015, issued in corresponding International Application No. PCT/JP2013/054141, filed Feb. 20, 2013, 5 pages.
Ashizawa, K., and K. Yamamoto, "Aluminum Foil for Lithium-Ion Battery," Furukawa-Sky Review 5:1-6, Apr. 2009. See the Office Action mailed in corresponding Japanese Application No. 2014-500732, submitted herewith.
Japanese Office Action mailed Nov. 8, 2016, issued in corresponding Japanese Application No. 2014-500732, filed Aug. 13, 2014, 6 pages.
Japanese Office Action mailed Feb. 28, 2017, issued in corresponding Japanese Application No. 2014-500732, filed Aug. 13, 2014, 6 pages.
Toyo Aluminium, "Lithium-Ion Rechargeable Electric Double Layer Capacitor Fuel Cell," 2008 New Battery Technology Outlook, May 1, 2008, pp. 243-244, with English language translation, 11 pages.
Japanese Office Action mailed Mar. 14, 2017, issued in corresponding Japanese Application No. 2014-500732, filed Aug. 13, 2014, 6 pages.

* cited by examiner

*Primary Examiner* — Lois Zheng
(74) *Attorney, Agent, or Firm* — Christensen O'Connor Johnson Kindness PLLC

(57) ABSTRACT

An object of the present invention is to provide an aluminum alloy foil for electrode current collectors having superior rolling properties, high conductivity, and high strength after the drying step following the application of the active material. According to the present invention, an aluminum alloy foil for electrode current collector, including 0.03 to 0.1% of Fe, 0.005 to 0.02% of Ti, 0 to 0.1% of Si, 0 to 0.01% of Cu, 99.85% or more of Al, with the rest being unavoidable impurities, wherein tensile strength of the aluminum alloy foil is 175 MPa or higher, and electrical conductivity of the aluminum alloy foil is 60% IACS or higher, is provided.

4 Claims, No Drawings

ALUMINUM ALLOY FOIL FOR ELECTRODE CHARGE COLLECTOR, AND METHOD FOR PRODUCING SAME

TECHNICAL FIELD

The present invention relates to current collectors used for secondary batteries, electric double-layer capacitors, lithium-ion capacitors, etc., and more particularly to aluminum ally foils used for an electrode current collectors for positive electrode or negative electrode.

BACKGROUND ART

Lithium-ion secondary batteries with high energy densities have been used as power sources for portable electronics such as a mobile phone and a notebook computer.

An electrode member of a lithium-ion secondary battery includes a positive electrode material, a separator, and a negative electrode material. Regarding a positive electrode material, an aluminum alloy foil, having excellent electrical conductivity and less heat generation without affecting electrical efficiency of a secondary battery, has been used. Here, aluminum alloy of JIS1085 and JIS3003 have been generally used. The positive electrode material can be obtained by applying an active material having a lithium-containing metal oxide such as $LiCoO_2$ as a chief component on both sides of the surface of the aluminum alloy foil, followed by drying, and then subjecting to compression forming using a press machine (this step is hereinafter referred to as press working). The positive electrode material as so prepared, a separator, and a negative electrode are stacked, and then the resulting stack is wound. After a shaping process is performed, it is encased.

An aluminum alloy foil used for a positive electrode material of a lithium-ion secondary battery has several problems that cuts occur during application of an active material and that ruptures occur at a bending portion during winding. Thus, a higher strength is required. At a drying step after the application of the active material, heat treatment is carried out at about 100 to 160° C. Accordingly, such heat treatment lowers the strength of the aluminum, and thus it is likely to generate middle waviness during press working. This induces wrinkles during winding, which reduces adhesion between the active material and the aluminum alloy foil. Besides, a rupture is likely to occur during a later slitting process. In particular, when the adhesion between the active material and a surface of the aluminum alloy foil decreases, their peeling is facilitated during repeated operation of discharge and charge. Unfortunately, this causes battery capacity to decrease.

Recently, a high electrical conductivity has been required for an aluminum alloy foil used for a positive electrode material of a lithium-ion secondary battery. What is meant by the electrical conductivity is a physical property indicating how easily electricity is conducted in a substance. The higher the electrical conductivity is, the more easily the electricity is conducted. Lithium-ion secondary batteries used for automobiles and/or electric tools necessitate a higher output characteristic than lithium-ion secondary batteries used for consumer-use mobile phones and/or laptop computers. When a large current flows, a lower electrical conductivity causes increase in the internal resistance of a battery. Consequently, this reduces output voltage of the battery.

An aluminum alloy foil with the Al purity of 99% or more has been used as an alloy foil for a lithium-ion secondary battery, which requires a high electrical conductivity. However, the aluminum alloy foil with the Al purity of 99% or more makes it difficult to improve its strength because the foil contains a fewer amounts of elements which contribute to the improvement in strength. That is, since there are fewer solid-solution elements or fine precipitates that can suppress the dislocation movement during heat treatment, the strength is largely decreased by the heat treatment conducted when the active material is applied.

For example, when the JIS 1000 series aluminum alloy is cast by semi-continuous casting of the molten metal alloy, a specific cast structure referred to as the "feather-like structure" is frequently found in the ingot thus obtained. This feather-like structure is a thin sheet-like growth twin, and is a cause for cracks during casting or sheet cracks during rolling. It has been known that generation of the feather-like structure can be suppressed by the addition of a refiner. However, when the refiner is added by a large amount, the solid solution content in the aluminum matrix would increase, which is considered to decrease the electrical conductivity at a large extent.

Therefore, concerning an aluminum alloy foil with high purity, it is extremely difficult to suppress the generation of the feather-like structure and to prevent the sheet crack during rolling, while maintaining high conductivity.

That is, as for materials for electrode current collectors, in particular, as for electrode materials for lithium-ion secondary batteries, an aluminum alloy foil having a high strength after the heat treatment during the drying step after the preparation of the aluminum alloy foil for electrode current collectors, and having superior foil rolling property for the improvement in productivity while maintaining the high electrical conductivity, has been desired.

Patent Literature 1 discloses an aluminum alloy foil with a tensile strength of 98 MPa or more, which is used for a battery collector. Patent Literature 1, however, is silent on its strength after a drying step in a manufacturing process of a positive electrode material for a lithium-ion secondary battery.

Patent Literature 2 discloses an aluminum alloy foil with a tensile strength of 160 MPa or more, which foil is used for an electrode current collector of a lithium-ion secondary battery. However, the strength after heat treatment, which simulates a drying step, is low. This strength is insufficient for preventing wrinkles during winding and ruptures during a slitting process because middle waviness occurs during press working.

Patent Literature 3 sets forth a method for preventing peeling from an active material without inducing plastic deformation during press working by increasing the strength. However, the alloy used contains Mn, Cu, and Mg as principal elements. Therefore, it is impossible to achieve a high electrical conductivity.

PRIOR ART REFERENCE

Patent Document

Patent Document 1: JPH11-162470A
Patent Document 2: JP2010-150637A
Patent Document 3: JP2008-150651A

SUMMARY OF THE INVENTION

Problems to be Solved by the Invention

The present invention has been made by taking the afore-mentioned circumstances into consideration. An object of the present invention is to provide an aluminum alloy foil for electrode current collectors having superior foil rolling properties, high electrical conductivity, and high strength after the drying step performed after the application of the active material.

Means for Solving the Problems

The present inventors have made an investigation regarding the aluminum alloy foil used for the positive electrode materials of the lithium-ion secondary batteries. Accordingly, the present inventors have found that an aluminum alloy foil for electrode current collectors having superior foil rolling properties, high electrical conductivity, and high strength after the drying step performed after the application of the active material can be obtained by controlling the alloy components within an appropriate range and by regulating the tensile strength and the electrical conductivity in a predetermined value. Then, the present inventors have found that such aluminum alloy foil would have superior foil rolling properties, high electrical conductivity, and high strength after the drying step performed after the application of the active material, by controlling the temperature at which the homogenization treatment of the ingot is carried out.

That is, according to the present invention, An aluminum alloy foil for electrode current collector, comprising: 0.03 to 0.1 mass % (hereinafter referred to as %) of Fe, 0.005 to 0.02% of Ti, 0 to 0.1% of Si, 0 to 0.01% of Cu, 99.85% or more of Al, with the rest consisting of unavoidable impurities, wherein tensile strength of the aluminum alloy foil is 175 MPa or higher, and electrical conductivity of the aluminum alloy foil is 60% IACS or higher, is provided.

Preferably, regarding the aluminum alloy foil of the present invention, Si in contained by 0.01 to 0.1%, and Cu is contained by 0.0001 to 0.01%.

According to the present invention, a method for manufacturing an aluminum alloy foil for electrode current collector, comprising the steps of: performing a homogeneous treatment by holding an ingot comprising 0.03 to 0.1% of Fe, 0.005 to 0.02% of Ti, 0 to 0.1% of Si, 0 to 0.01% of Cu, 99.85% or more of Al, with the rest consisting of unavoidable impurities at 550° C. to 620° C. for 1 to 20 hours; and performing rolling after the homogeneous treatment, is provided. Preferably, concerning the manufacturing method, the ingot is obtained by the steps of: melting an aluminum alloy comprising 0.03 to 0.1 mass % of Fe, 0 to 0.1% of Si, 0 to 0.01% of Cu, 99.85% or more of Al, with the rest consisting of unavoidable impurities; adding a refiner during a holding step for holding a melted metal so that Ti content would be in a range of 0.005 to 0.02%; and performing casting.

Effect of the Invention

According to the present invention, since the aluminum alloy foil has a high electrical conductivity as well as high strength after the drying process performed after the application of an active material, an aluminum alloy foil for electrode current collectors such as the aluminum alloy foil for lithium ion batteries can be provided. Here, no generation of middle waviness is observed during the press working, and it is capable to prevent peeling of the active material layer, rupture during a slitting process, and sheet crack during the foil rolling.

EMBODIMENT OF THE INVENTION

The composition of the aluminum alloy for lithium ion batteries of the present invention comprises 0.03 to 0.1 mass % of Fe, 0.005 to 0.02% of Ti, 0 to 0.1% of Si, 0 to 0.01% of Cu, 99.85% or more of Al, with the rest consisting of unavoidable impurities.

Fe is an element that increases strength by addition thereof, and 0.03 to 0.1% of Fe is included. When the additive amount of Fe is less than 0.03%, there is no contribution to the improvement in strength. In contrast, when the additive amount of Fe exceeds 0.1%, it is unfavorable since it becomes difficult to maintain the high electrical conductivity. More preferably, the content of Fe is 0.04 to 0.08%.

Ti is an element that refines the crystal particle, improves the foil rolling property, and improves strength. Here, 0.005 to 0.02% of Ti is included. By adding Al—Ti mother alloy or Al—Ti—B mother alloy, compounds such as $Al_3Ti$ and $TiB_2$ function as a heterogeneous nuclear generating particle, and thus the crystal particle is refined. In addition, when the chemical element Ti does not form a chemical compound and forms a solid solution, it can improve strength. When the amount of Ti is less than 0.005%, there is no contribution to improvement in strength, and the crystal particle of the ingot becomes large. Then, generation of seams in the direction of rolling would be seen in the macro structure, and such seams would be a cause for the sheet crack during the rolling. On the other hand, when the amount of Ti exceeds 0.02%, it is unfavorable since not only the afore-mentioned effect reaches saturation, but large amount of coarse compounds of Al—Ti system is generated, which would act as a source of pinholes during the rolling. In addition, it is unfavorable since it becomes difficult to maintain the high electrical conductivity. Preferable content of Ti is 0.008 to 0.016%.

Si is an optional element, and may not be added. However, when it is added, it can improve the strength. Preferably, Si is contained by 0.01 to 0.1%. When the amount of Si added is less than 0.01%, there is hardly any contribution to the improvement in strength. Here, Si is included in a common Al base metal as impurities. As a result, in order to regulate the amount of Si to less than 0.01%, a base metal with high purity need be used. This is unfavorable in view of economic reasons. On the other hand, when the added amount of Si exceeds 0.1%, it is unfavorable since it becomes difficult to maintain the high electrical conductivity. More preferable content of Si is 0.02 to 0.08%.

Cu is an optional element, and may not be added. However, when it is added, it can improve the strength. Preferably, Cu is contained by 0.0001 to 0.01%. When the amount of Cu added is less than 0.0001%, there is hardly any contribution to the improvement in strength. It would also require the use of a base metal with high purity. This is difficult in view of economic reasons. On the other hand, when the added amount of Cu exceeds 0.01%, it is unfavorable since it becomes difficult to maintain the high conductivity. More preferable content of Cu is 0.0005 to 0.008%.

The present material contains unavoidable impurities such as Cr, Ni, Zn, Mn, Mg, B, V, Zr and the like. An amount of each of the unavoidable impurities is preferably 0.02% or less, and a total amount thereof is preferably 0.07% or less.

<Original Sheet Strength>

With regard to an aluminum alloy added primarily with Fe and Ti, when the temperature conditions for the homogenization treatment of the ingot is controlled at a predetermined temperature, each of the elements added by a small amount would form solid solution as much as possible, thereby reducing dislocation movement and achieving higher strength. Further, as the content of the solid solution increase, work hardening would also increase, thereby strengthening the foil during the cold rolling and foil rolling. Accordingly, the strength of the aluminum alloy foil can be further improved.

Tensile strength of an original sheet after the final cold rolling should be 175 MPa or higher. When the tensile strength is less than 175 MPa, the strength would be insufficient, and cuts or cracks easily occur by the tension applied during the application of the active material. In addition, it is unfavorable since middle waviness would occur, which has a disadvantageous effect on productivity.

<Strength after Heat Treatment>

In the procedure of manufacturing an electrode material, a paste for forming an active material onto the surface of the aluminum alloy foil is applied, and then a heat treatment is carried out at approximately 100 to 160° C. in order to remove the solvent in the active material. Here, in such case, the aluminum alloy foil may soften and then the strength may decrease during the course of recovery. In order to prevent the decrease in strength during the course of recovery after the heat treatment, it has been considered that reducing the dislocation movement by using solid-solution elements or precipitates in the aluminum alloy is effective. In particular, in an aluminum alloy of the present invention primarily added with Fe and Ti, a solid solution content of Fe has a large effect. For example, by controlling the temperature of the homogenization treatment of the ingot, the solid solution content of Fe can be adjusted, thereby achieving the suppression of the decrease in strength after the heat treatment.

In the present invention, it is preferable that the aluminum alloy foil that went through the procedures of active material application step, drying step, heat treatment step, and the recovery step would have a tensile strength of 170 MPa or higher. Specifically in the present invention, the tensile strength of the aluminum alloy foil after the application of the active material is 170 MPa or higher after either one of the heat treatments of 100° C. for 24 hour, 140° C. for 3 hours, or 160° C. for 1 hour. When the tensile strength is too weak, middle waviness is likely to occur during press working. This causes wrinkles during winding, and decrease in adhesion between the active material and the aluminum alloy foil, and ruptures during the later slitting process. In addition, there is a fear that adhesion between the active material and the surface of the aluminum alloy foil decreases, resulting in further peeling during the repeated discharge-charge and decrease in the battery capacity. In order to achieve such tensile strength, the afore-mentioned homogenization treating condition should be controlled appropriately.

<Electrical Conductivity>

The electrical conductivity of the aluminum alloy foil for electrode current collectors of the present invention should be 60% IACS or higher, preferably 61% IACS or higher. The electrical conductivity can be adjusted by controlling the solid solution state of a solute element. An electrode current collector according to an embodiment of the present invention may be used for a lithium-ion secondary battery. In that case, when a discharge rate exceeds 5 C, which is a high current level, electrical conductivity of less than 60% IACS is not preferable because the output property would decrease. Note that "1 C" means a current level to complete, in one hour, the discharge from a cell having the nominal capacity value when a constant current at the current level is discharged from the cell.

<Method for Manufacturing Aluminum Alloy Foil>

In the present invention, the following procedure is used to manufacture an aluminum alloy ingot having the above alloy composition.

The aluminum alloy ingot having the afore-mentioned composition is manufactured by way of a melting step performed by a melting furnace, a holding step for holding the melted metal by a holding furnace, and a casting step performed by a casting machine. In the melting step, the aluminum alloy is melted to obtain a melted metal containing Fe in the afore-mentioned composition range. Subsequently, the melted metal is transferred to the holding furnace, and is held in the holding furnace. In this holding furnace, Ti is added to the melted metal by the afore-mentioned composition range. The method for adding Ti to the melted metal is not particularly limited. Al—Ti mother alloy, Al—Ti—B mother alloy, or Al—Ti—C mother alloy formed into a wire or other shape and is added. It is preferable to use the mother alloy containing Al by 5 to 10 mass %, for example, Al-5 to 10 mass % Ti, Al-4 to 6 mass % Ti-0.5 to 2 mass % B are preferable. The melted metal after the addition of Ti is subjected to known degassing treatment. After the degassing treatment, the melted metal is transferred to the casting machine. From the melted metal transferred to the casting machine, an ingot is manufactured by a semi-continuous casting or continuous casting. It is preferable to perform a homogenizing treatment under 550 to 620° C. for 1 to 20 hours for the cast aluminum alloy ingot.

When the temperature of the homogenizing treatment is lower than 550° C. or the holding time is shorter than 1 hour, elements such as Ti and Fe cannot form solid solution sufficiently. This would result in shortage of solid solution content, and the strength before and after the subsequent heat treatment is lowered. The above condition is thus not preferred. When the temperature exceeds 620° C., the ingot melts locally. In addition, a small amount of hydrogen gas taken into the ingot during casting may appear on the surface, thereby readily causing swelling on the material surface. The above condition is thus not preferred. In addition, when the homogenizing treatment period exceeds 20 hours, decrease in productivity and increase in cost is observed.

The above homogenizing treatment is followed by known hot rolling, cold rolling, and foil rolling to produce an aluminum alloy foil with a thickness of 6 to 30 μm. The hot rolling can be started at a temperature of 500° C. or higher after the homogenizing treatment. When the hot rolling has a starting temperature of lower than 500° C., a precipitation amount of elements such as Ti and Fe increases. Consequently, it is difficult to preserve a solid solution content to improve its strength. The solid solution content of Fe, in particular, may have a large effect on maintaining high strength. When the temperature is in the range from 350 to 500° C., Fe is susceptible to precipitation as an intermetallic compound of $Al_3Fe$ series. Thus, a time going through this temperature range should be as short as possible. During the hot rolling, in particular, a time going through a temperature range from 350 to 500° C. is preferably within 20 minutes. The final temperature of the hot rolling is preferably 200 to 330° C.

Here, in order to adjust the strength of the aluminum alloy foil or to control the crystal particle, an intermediate annealing may be conducted before or in between the cold rollings. Conventional methods can be applied. When the intermediate annealing is conducted, the sheet thickness should be 0.4 to 1.3 mm, and the temperature for the intermediate annealing is 300 to 500° C. for example. In particular, when a batch furnace is used, the aluminum alloy is held at 300 to 500° C. for 1 to 5 hours. Here, when the continuous annealing furnace is used, the aluminum alloy is held at 300 to 500° C. for 2 minutes to obtain the same effect as the annealing by the batch furnace.

The thickness of the aluminum alloy foil after the final cold rolling can usually be adjusted to 6 to 30 μm as the aluminum alloy foil for electrode current collector. When the thickness is less than 6 μm, pin holes are likely to occur during the foil rolling, which is unfavorable. When the thickness exceeds 30 μm, the volume and weight of an electrode current collector increase and the volume and weight of an active material decrease in the same occupied space. In the case of a lithium-ion secondary battery, the above is not preferable because a battery capacity decreases.

EXAMPLES

Hereinafter, the present invention will be described by way of Examples, however, the Examples are merely an example, and thus the present invention shall not be limited to those.

1. Without Intermediate Annealing

The aluminum alloy having the composition shown in Table 1 was subjected to a semi-continuous casting including a melting step performed by a melting furnace, a holding step for holding the melted metal by a holding furnace, and a casting step performed by a casting machine, to give an ingot having a thickness of 500 mm. In the holding step, Al—Ti mother alloy was added as the refiner. Then, the ingot was subjected to scalper, followed by homogenizing treatment under the conditions designated in Table 1. Then, hot rolling was performed to produce sheets with a thickness of 3.0 mm. Further, without performing the intermediate annealing, cold rolling and foil rolling were performed continuously. In this manner, aluminum alloy foil (original sheet) with a thickness of 12 μm was obtained.

TABLE 1

| Alloy No. | | Chemical Component (mass %) | | | | | Homogenizing Treatment Conditions | |
|---|---|---|---|---|---|---|---|---|
| | | Fe | Ti | Si | Cu | Al | Temperature (° C.) | Time (hr) |
| Example | 1 | 0.03 | 0.010 | 0.03 | 0.0034 | 99.91 | 620 | 6 |
| | 2 | 0.06 | 0.005 | 0.05 | 0.0048 | 99.86 | 620 | 3 |
| | 3 | 0.07 | 0.008 | — | — | 99.91 | 620 | 3 |
| | 4 | 0.06 | 0.014 | 0.04 | 0.0008 | 99.87 | 610 | 6 |
| | 5 | 0.05 | 0.017 | — | — | 99.90 | 580 | 6 |
| | 6 | 0.07 | 0.013 | 0.04 | 0.0100 | 99.86 | 580 | 6 |
| | 7 | 0.04 | 0.006 | 0.10 | 0.0017 | 99.85 | 550 | 3 |
| | 8 | 0.06 | 0.020 | 0.03 | 0.0087 | 99.86 | 550 | 6 |
| | 9 | 0.10 | 0.012 | 0.02 | 0.0022 | 99.86 | 550 | 3 |
| Comparative Example | 1 | 0.05 | 0.004 | 0.05 | 0.0157 | 99.86 | 620 | 3 |
| | 2 | 0.10 | 0.003 | 0.12 | 0.0023 | 99.75 | 610 | 6 |
| | 3 | 0.01 | 0.007 | 0.07 | 0.0012 | 99.89 | 610 | 3 |
| | 4 | 0.07 | 0.025 | — | — | 99.88 | 580 | 6 |
| | 5 | 0.15 | 0.010 | 0.06 | 0.0088 | 99.75 | 580 | 3 |
| | 6 | 0.06 | 0.004 | 0.03 | 0.0055 | 99.88 | 520 | 3 |
| | 7 | 0.08 | 0.012 | 0.04 | 0.0006 | 99.86 | 520 | 3 |
| | 8 | 0.09 | 0.009 | 0.02 | 0.0065 | 99.86 | 580 | 0.5 |

Next, each aluminum alloy foil was used to prepare a positive electrode material for a lithium-ion secondary battery. PVDF as a binder was added to an active material primarily containing $LiCoO_2$ to yield the active material paste. This active material paste was applied on both surfaces of the aluminum alloy foil with a width of 30 mm. Then, the resulting aluminum alloy foil was subjected to heat treatment for drying under three different conditions including 120° C. for 24 hours, 140° C. for 3 hours, and 160° C. for 1 hour. Subsequently, a roller press machine was used to perform compression forming to increase the density of the active material.

Each aluminum alloy foil as so manufactured was used to measure and evaluate: rolling property, tensile strength, electrical conductivity, tensile strength after the heat treatment at 120° C. for 24 hours, tensile strength after the heat treatment at 140° C. for 3 hours, and tensile strength after the heat treatment at 160° C. for 1 hour. The results are shown in Table 2. In addition, occurrence of cut during the active material application step and the occurrence of peeling of active material layer were observed for each positive electrode materials. The results are shown in Table 3.

TABLE 2

| Alloy No. | | Original Sheet | | Heat Treatment at 100° C. for 24 hours | Heat Treatment at 140° C. for 3 hours | Heat Treatment at 160° C. for 1 hour | Rolling Property |
|---|---|---|---|---|---|---|---|
| | | Tensile Strength (MPa) | Electrical Conductivity (% IACS) | Tensile Strength (MPa) | Tensile Strength (MPa) | Tensile Strength (MPa) | |
| Example | 1 | 195 | 61.7 | 195 | 191 | 185 | Acceptable |
| | 2 | 196 | 61.6 | 195 | 190 | 183 | Acceptable |
| | 3 | 198 | 62.1 | 197 | 194 | 186 | Acceptable |
| | 4 | 207 | 60.7 | 205 | 200 | 197 | Acceptable |
| | 5 | 194 | 62.2 | 193 | 190 | 188 | Acceptable |
| | 6 | 213 | 60.6 | 208 | 205 | 201 | Acceptable |
| | 7 | 196 | 61.5 | 194 | 192 | 187 | Acceptable |
| | 8 | 192 | 61.9 | 191 | 188 | 182 | Acceptable |
| | 9 | 194 | 61.4 | 192 | 189 | 184 | Acceptable |
| Comparative Example | 1 | 215 | 59.4 | 210 | 199 | 192 | Unacceptable |
| | 2 | 223 | 58.7 | 222 | 216 | 211 | Unacceptable |
| | 3 | 172 | 62.8 | 169 | 165 | 161 | Acceptable |
| | 4 | 205 | 59.3 | 204 | 202 | 199 | Acceptable |
| | 5 | 212 | 59.2 | 210 | 206 | 201 | Acceptable |
| | 6 | 174 | 62.6 | 168 | 159 | 151 | Unacceptable |
| | 7 | 172 | 62.9 | 167 | 153 | 149 | Acceptable |
| | 8 | 171 | 62.8 | 166 | 160 | 153 | Acceptable |

TABLE 3

| | | Heat Treatment at 100° C. for 24 hours | | Heat Treatment at 140° C. for 3 hours | | Heat Treatment at 160° C. for 1 hour | |
|---|---|---|---|---|---|---|---|
| Alloy No. | | Cut During Active-material-application Step | Peeling of Active Material | Cut During Active-material-application Step | Peeling of Active Material | Cut During Active-material-application Step | Peeling of Active Material |
| Example | 1 | None | None | None | None | None | None |
| | 2 | None | None | None | None | None | None |
| | 3 | None | None | None | None | None | None |
| | 4 | None | None | None | None | None | None |
| | 5 | None | None | None | None | None | None |
| | 6 | None | None | None | None | None | None |
| | 7 | None | None | None | None | None | None |
| | 8 | None | None | None | None | None | None |
| | 9 | None | None | None | None | None | None |
| Comparative Example | 1 | None | None | None | None | None | None |
| | 2 | None | None | None | None | None | None |
| | 3 | Observed | Observed | Observed | Observed | Observed | Observed |
| | 4 | None | None | None | None | None | None |
| | 5 | None | None | None | None | None | None |
| | 6 | Observed | Observed | Observed | Observed | Observed | Observed |
| | 7 | Observed | Observed | Observed | Observed | Observed | Observed |
| | 8 | Observed | Observed | Observed | Observed | Observed | Observed |

<Tensile Strength>

The tensile strength of the aluminum alloy foil which had been cut out in a direction of the rolling was measured with an Instron tension tester AG-10kNX, manufactured by Shimadzu Corporation. The measurement was performed under conditions with a test piece size of 10 mm×100 mm, at a gauge length of 50 mm, and at a crosshead speed of 10 mm/min. In addition, in order to simulate the drying process, heat treatment at 120° C. for 24 hours, at 140° C. for 3 hours, or at 160° C. for 1 hour was carried out. Then, the aluminum alloy foil was cut out in a direction of the rolling. Subsequently, the tensile strength was measured in the same manner as in the above. Regarding the tensile strength of the test piece before the heat treatment, the tensile strength of 175 MPa or higher was considered acceptable and the tensile strength of less than 175 MPa was considered as unacceptable. Regarding the tensile strength after the heat treatment at 120° C. for 24 hours, at 140° C. for 3 hours, or at 160° C. for 1 hour, the tensile strength of 170 MPa or higher was considered as acceptable, and the tensile strength of less than 170 MPa was considered as unacceptable.

<Electrical Conductivity>

With regard to electrical conductivity, electrical resistivity was measured in accordance with JIS C2525:1999 by a four-terminal method, and was converted to electrical conductivity. The electrical conductivity of 60% IACS or higher was considered acceptable and the electrical conductivity of less than 60% IACS was determined as unacceptable.

<Rolling Property>

Regarding the rolling property, the one which was able to manufacture continuously until the foil reaches the thickness of 12 μm without any sheet cracks was considered as acceptable, and the one which suffered a sheet crack during rolling was considered as unacceptable.

<Whether or not Cut Occurs during Active-Material-Application Step>

Whether or not a cut occurred in a positive electrode material applied during an active-material-application step was visually inspected. The case without a cut was considered acceptable, and the case with a cut was determined as unacceptable.

<Whether or not Active Material Layer Detaches>

The presence or absence of the active material layer peeling was visually inspected. When no peeling occurred, the case was considered acceptable. When at least a part of the active material was peeled, the case was determined as unacceptable.

In Examples 1 to 9, there was no occurrence of cut during the active-material-application step nor the peeling of the active material layer. In addition, their electrical conductivity was high. Thus, good evaluation results were achieved.

In Comparative Example 1, the low content of Ti resulted in occurrence of sheet cracks during the foil rolling. In addition, the high content of Cu resulted in insufficient electrical conductivity.

In Comparative Example 2, the low content of Ti resulted in occurrence of sheet cracks during the foil rolling. In addition, the high content of Si resulted in insufficient Al purity and electrical conductivity.

In Comparative Example 3, the low content of Fe resulted in insufficient tensile strength, thereby causing cut during the active material application step and peeling of the active material layer.

In Comparative Example 4, the high content of Ti resulted in insufficient electrical conductivity.

In Comparative Example 5, the high content of Fe resulted in insufficient Al purity and electrical conductivity.

In Comparative Example 6, the low content of Ti resulted in occurrence of sheet cracks during the foil rolling. In addition, the low temperature of the homogenizing treatment resulted in insufficient tensile strength, thereby causing cut during the active material application step and peeling of the active material layer.

In Comparative Example 7, the low temperature of the homogenizing treatment resulted in insufficient tensile strength, thereby causing cut during the active material application step and peeling of the active material layer.

In Comparative Example 8, the short holding time for the homogenizing treatment resulted in insufficient tensile strength, thereby causing cut during the active material application step and peeling of the active material layer.

2. With Intermediate Annealing

The aluminum alloy having the composition shown in Table 1 was subjected to a semi-continuous casting including a melting step performed by a melting furnace, a holding step for holding the melted metal by a holding furnace, and a casting step performed by a casting machine, to give an ingot having a thickness of 500 mm. In the holding step, Al—Ti mother alloy was added as the refiner. Then, the ingot was subjected to scalper, followed by homogenizing treatment under the conditions designated in Table 1. Then, hot rolling was performed to produce sheets with a thickness of 3.0 mm. Subsequently, cold rolling was performed to obtain a sheet thickness of 0.8mm, followed by the intermediate annealing at 440° C. for 3 hours. Then, cold rolling and foil rolling were further performed to obtain an aluminum alloy foil (original sheet) with a foil thickness of 12 μm.

Next, each aluminum alloy foil was used to prepare a positive electrode material for a lithium-ion secondary battery. PVDF as a binder was added to an active material primarily containing $LiCoO_2$ to yield the active material paste. This active material paste was applied on both surfaces of the aluminum alloy foil with a width of 30 mm. Then, the resulting aluminum alloy foil was subjected to heat treatment for drying under three different conditions including 120° C. for 24 hours, 140° C. for 3 hours, and 160° C. for 1 hour. Subsequently, a roller press machine was used to perform compression forming to increase the density of the active material.

Each aluminum alloy foil as so manufactured was used to measure and evaluate: rolling property, tensile strength, electrical conductivity, tensile strength after the heat treatment at 120° C. for 24 hours, tensile strength after the heat treatment at 140° C. for 3 hours, and tensile strength after the heat treatment at 160° C. for 1 hour. The results are shown in Table 4. In addition, occurrence of cut during the active material application step and the occurrence of peeling of active material were observed for each positive electrode materials. The results are shown in Table 5. Here, the criteria for the evaluation were the same as in the "1. Without Intermediate Annealing".

TABLE 4

| | | Original Sheet | | Heat Treatment at 100° C. for 24 hours | Heat Treatment at 140° C. for 3 hours | Heat Treatment at 160° C. for 1 hour | |
|---|---|---|---|---|---|---|---|
| | Alloy No. | Tensile Strength (MPa) | Electrical Conductivity (% IACS) | Tensile Strength (MPa) | Tensile Strength (MPa) | Tensile Strength (MPa) | Rolling Property |
| Example | 1 | 184 | 62.3 | 182 | 177 | 175 | Acceptable |
| | 2 | 184 | 62.1 | 183 | 179 | 173 | Acceptable |
| | 3 | 181 | 62.7 | 181 | 179 | 174 | Acceptable |
| | 4 | 194 | 61.5 | 192 | 186 | 180 | Acceptable |
| | 5 | 182 | 62.6 | 182 | 178 | 173 | Acceptable |
| | 6 | 192 | 51.3 | 189 | 184 | 178 | Acceptable |
| | 7 | 184 | 62.1 | 183 | 180 | 174 | Acceptable |
| | 8 | 181 | 62.5 | 179 | 175 | 172 | Acceptable |
| | 9 | 182 | 61.9 | 181 | 176 | 171 | Acceptable |
| Comparative Example | 1 | 203 | 59.8 | 199 | 187 | 181 | Unacceptable |
| | 2 | 208 | 59.4 | 205 | 199 | 194 | Unacceptable |
| | 3 | 163 | 63.3 | 161 | 152 | 144 | Acceptable |
| | 4 | 197 | 59.7 | 196 | 193 | 186 | Acceptable |
| | 5 | 201 | 59.8 | 198 | 194 | 189 | Acceptable |
| | 6 | 165 | 63.0 | 161 | 152 | 141 | Unacceptable |
| | 7 | 161 | 63.4 | 156 | 149 | 140 | Acceptable |
| | 8 | 160 | 63.1 | 157 | 151 | 143 | Acceptable |

TABLE 5

| | | Heat Treatment at 100° C. for 24 hours | | Heat Treatment at 140° C. for 3 hours | | Heat Treatment at 160° C. for 1 hour | |
|---|---|---|---|---|---|---|---|
| | Alloy No. | Cut During Active-material-application Step | Peeling of Active Material | Cut During Active-material-application Step | Peeling of Active Material | Cut During Active-material-application Step | Peeling of Active Material |
| Example | 1 | None | None | None | None | None | None |
| | 2 | None | None | None | None | None | None |
| | 3 | None | None | None | None | None | None |
| | 4 | None | None | None | None | None | None |
| | 5 | None | None | None | None | None | None |
| | 6 | None | None | None | None | None | None |
| | 7 | None | None | None | None | None | None |
| | 8 | None | None | None | None | None | None |
| | 9 | None | None | None | None | None | None |
| Comparative Example | 1 | None | None | None | None | None | None |
| | 2 | None | None | None | None | None | None |
| | 3 | Observed | Observed | Observed | Observed | Observed | Observed |
| | 4 | None | None | None | None | None | None |
| | 5 | None | None | None | None | None | None |
| | 6 | Observed | Observed | Observed | Observed | Observed | Observed |
| | 7 | Observed | Observed | Observed | Observed | Observed | Observed |
| | 8 | Observed | Observed | Observed | Observed | Observed | Observed |

In Examples 1 to 9, there was no occurrence of cut during the active-material-application step nor the peeling of the active material. In addition, their electrical conductivity was high. Thus, good evaluation results were achieved.

In Comparative Example 1, the low content of Ti resulted in occurrence of sheet cracks during the foil rolling. In addition, the high content of Cu resulted in insufficient electrical conductivity.

In Comparative Example 2, the low content of Ti resulted in occurrence of sheet cracks during the foil rolling. In addition, the high content of Si resulted in insufficient Al purity and electrical conductivity.

In Comparative Example 3, the low content of Fe resulted in insufficient tensile strength, thereby causing cut during the active material application step and peeling of the active material layer.

In Comparative Example 4, the high content of Ti resulted in insufficient electrical conductivity.

In Comparative Example 5, the high content of Fe resulted in insufficient Al purity and electrical conductivity.

In Comparative Example 6, the low content of Ti resulted in occurrence of sheet cracks during the foil rolling. In addition, the low temperature of the homogenizing treatment resulted in insufficient tensile strength, thereby causing cut during the active material application step and peeling of the active material layer.

In Comparative Example 7, the low temperature of the homogenizing treatment resulted in insufficient tensile strength, thereby causing cut during the active material application step and peeling of the active material layer.

In Comparative Example 8, the short holding time for the homogenizing treatment resulted in insufficient tensile strength, thereby causing cut during the active material application step and peeling of the active material layer.

The invention claimed is:

1. An electrode of a secondary battery, comprising:
an aluminum alloy foil, comprising:
0.03 to 0.1 mass % (hereinafter referred to as %) of Fe, 0.005 to 0.02% of Ti, 0 to 0.1% of Si, 0 to 0.01% of Cu, 99.85% or more of Al, with the rest consisting of unavoidable impurities, wherein tensile strength of the aluminum alloy foil is 175 MPa or higher, and electrical conductivity of the aluminum alloy foil is 60% IACS or higher; and
an active material layer provided on the aluminum alloy foil.

2. The electrode of a secondary battery of claim 1, wherein in the aluminum alloy foil, Si is contained by 0.01 to 0.1%, and Cu is contained by 0.0001 to 0.01%.

3. A method for manufacturing an electrode of a secondary battery, comprising the steps of:
obtaining an aluminum alloy foil by performing a homogenous treatment by holding an ingot comprising 0.03 to 0.1 mass % of Fe, 0.005 to 0.02% of Ti, 0 to 0.01% of Si, 0 to 0.01% of Cu, 99.85% or more of Al, with the rest consisting of unavoidable inpurities at 550° C. to 620° C for 1 to 20 hours; and performing rolling after the homogeneous treatment;
applying an active material paste on the aluminum alloy foil; and
drying the active material paste.

4. The manufacturing method of claim 3, wherein the ingot is obtained by the steps of:
melting an aluminum alloy comprising 0.03 to 0.1% of Fe, 0 to 0.1% of Si, 0 to 0.01% of Cu, 99.85% or more of Al, with the rest consisting of unavoidable impurities;
adding a refiner during a holding step for holding a melted metal so that Ti content would be in a range of 0.005 to 0.02%; and
performing casting.

* * * * *